United States Patent
Aaltonen et al.

(10) Patent No.: US 8,700,613 B2
(45) Date of Patent: Apr. 15, 2014

(54) AD SPONSORS FOR MOBILE DEVICES BASED ON DOWNLOAD SIZE

(75) Inventors: Janne Aaltonen, Turku (FI); Ismo Antikainen, Masala (FI); Timo Ahopelto, Helsinki (FI)

(73) Assignee: Apple Inc., Cupertino, CA (US)

(*) Notice: Subject to any disclaimer, the term of this patent is extended or adjusted under 35 U.S.C. 154(b) by 378 days.

(21) Appl. No.: 12/019,966

(22) Filed: Jan. 25, 2008

(65) Prior Publication Data

US 2008/0228758 A1  Sep. 18, 2008

(30) Foreign Application Priority Data

Mar. 13, 2007 (GB) .................... 0704837.4

(51) Int. Cl.
  *G06F 7/00* (2006.01)
  *G06F 17/30* (2006.01)
  *G06Q 30/02* (2012.01)
(52) U.S. Cl.
  CPC ...... *G06F 17/30864* (2013.01); *G06Q 30/0277* (2013.01); *G06Q 30/0273* (2013.01)
  USPC ............... 707/723; 705/14.54; 705/14.69; 705/14.73
(58) Field of Classification Search
  CPC ............... G06F 17/30864; G06Q 30/0277; G06Q 30/0273
  USPC ............... 705/14.54, 14.69, 14.73; 707/723
  See application file for complete search history.

(56) References Cited

U.S. PATENT DOCUMENTS

| | | |
|---|---|---|
| 5,408,519 A | 4/1995 | Pierce et al. |
| 5,613,213 A | 3/1997 | Naddell et al. |
| 5,640,590 A | 6/1997 | Luther |
| 5,697,844 A | 12/1997 | Von Kohorn |
| 5,892,451 A | 4/1999 | May |
| 5,978,775 A | 11/1999 | Chen |
| 5,978,833 A | 11/1999 | Pashley et al. |
| 6,009,458 A | 12/1999 | Hawkins |
| 6,023,700 A | 2/2000 | Owens et al. |
| 6,038,591 A | 3/2000 | Wolfe |
| 6,043,818 A | 3/2000 | Nakano |
| 6,097,942 A | 8/2000 | Laiho |
| 6,205,432 B1 | 3/2001 | Gabbard |

(Continued)

FOREIGN PATENT DOCUMENTS

| | | |
|---|---|---|
| BE | 1015704 | 7/2005 |
| DE | 19941461 | 3/2001 |

(Continued)

OTHER PUBLICATIONS

International Search Report and Written Opinion of the International Search Authority dated May 8, 2008 for International Patent Application No. PCT/EP2008/051229.

(Continued)

*Primary Examiner* — Cheyne D Ly
(74) *Attorney, Agent, or Firm* — Novak Druce Connolly Bove + Quigg LLP

(57) ABSTRACT

The present invention relates to a method and system for ranking search results and is particularly, but not exclusively, suited to providing search results when the delivery of data corresponding to the search results is metered, such as when data are delivered to terminals connected to mobile networks.

25 Claims, 11 Drawing Sheets

(56) References Cited

U.S. PATENT DOCUMENTS

| | | | |
|---|---|---|---|
| 6,212,545 B1* | 4/2001 | Ohtani et al. | 709/202 |
| 6,222,925 B1 | 4/2001 | Shiels | |
| 6,269,361 B1* | 7/2001 | Davis et al. | 1/1 |
| 6,334,145 B1 | 12/2001 | Adams et al. | |
| 6,338,044 B1 | 1/2002 | Cook et al. | |
| 6,345,279 B1 | 2/2002 | Li et al. | |
| 6,381,465 B1 | 4/2002 | Chern et al. | |
| 6,389,278 B1 | 5/2002 | Singh | |
| 6,405,243 B1 | 6/2002 | Nielsen | |
| 6,408,309 B1 | 6/2002 | Agarwal | |
| 6,438,557 B1 | 8/2002 | Dent | |
| 6,516,416 B2 | 2/2003 | Gregg | |
| 6,628,247 B2 | 9/2003 | Toffolo | |
| 6,633,318 B1 | 10/2003 | Kim | |
| 6,646,657 B1 | 11/2003 | Rouser | |
| 6,684,249 B1 | 1/2004 | Frerichs et al. | |
| 6,718,551 B1 | 4/2004 | Swix et al. | |
| 6,816,724 B1 | 11/2004 | Asikainen | |
| 6,826,572 B2* | 11/2004 | Colace et al. | 707/999.01 |
| 6,920,326 B2 | 7/2005 | Agarwal et al. | |
| 7,035,812 B2* | 4/2006 | Meisel et al. | 705/14.54 |
| 7,058,696 B1 | 6/2006 | Phillips et al. | |
| 7,072,947 B1 | 7/2006 | Knox et al. | |
| 7,136,903 B1 | 11/2006 | Phillips et al. | |
| 7,149,537 B1 | 12/2006 | Kupsh et al. | |
| 7,174,309 B2 | 2/2007 | Niwa | |
| 7,181,415 B2 | 2/2007 | Blaser et al. | |
| 7,188,085 B2 | 3/2007 | Pelletier | |
| 7,222,105 B1 | 5/2007 | Romansky | |
| 7,225,342 B2 | 5/2007 | Takao | |
| 7,296,158 B2 | 11/2007 | Staddon | |
| 7,328,343 B2 | 2/2008 | Caronni | |
| 7,360,084 B1 | 4/2008 | Hardjono | |
| 7,383,329 B2 | 6/2008 | Erickson | |
| 7,383,586 B2 | 6/2008 | Cross et al. | |
| 7,455,590 B2 | 11/2008 | Hansen | |
| 7,457,946 B2 | 11/2008 | Hind | |
| 7,492,371 B2 | 2/2009 | Jeffrey | |
| 7,558,559 B2 | 7/2009 | Alston | |
| 7,581,101 B2 | 8/2009 | Ahtisaari | |
| 7,690,026 B2 | 3/2010 | Zhu | |
| 7,882,543 B2 | 2/2011 | Mousseau | |
| 8,346,709 B2 | 1/2013 | Silverman et al. | |
| 2001/0042017 A1 | 11/2001 | Matsukawa | |
| 2001/0047272 A1 | 11/2001 | Frietas et al. | |
| 2001/0051925 A1 | 12/2001 | Dong-seok | |
| 2002/0002510 A1 | 1/2002 | Sharp | |
| 2002/0004413 A1 | 1/2002 | Inoue | |
| 2002/0004743 A1 | 1/2002 | Kutaragi | |
| 2002/0006803 A1 | 1/2002 | Mendiola et al. | |
| 2002/0016736 A1 | 2/2002 | Cannon et al. | |
| 2002/0019829 A1 | 2/2002 | Shapiro | |
| 2002/0052754 A1 | 5/2002 | Joyce | |
| 2002/0059379 A1 | 5/2002 | Harvey | |
| 2002/0061743 A1 | 5/2002 | Hutcheson | |
| 2002/0073210 A1 | 6/2002 | Low et al. | |
| 2002/0075305 A1 | 6/2002 | Beaton et al. | |
| 2002/0077130 A1 | 6/2002 | Owensby | |
| 2002/0078006 A1 | 6/2002 | Shteyn | |
| 2002/0082923 A1 | 6/2002 | Merriman et al. | |
| 2002/0083411 A1 | 6/2002 | Bouthors et al. | |
| 2002/0095330 A1* | 7/2002 | Berkowitz et al. | 705/14 |
| 2002/0111177 A1 | 8/2002 | Castres | |
| 2002/0128029 A1 | 9/2002 | Nishikawa | |
| 2002/0137507 A1 | 9/2002 | Winkler | |
| 2002/0138291 A1 | 9/2002 | Vaidyanathan et al. | |
| 2002/0141403 A1 | 10/2002 | Akahane | |
| 2002/0164962 A1 | 11/2002 | Mankins | |
| 2002/0174430 A1 | 11/2002 | Ellis | |
| 2002/0183045 A1 | 12/2002 | Emmerson | |
| 2003/0003929 A1 | 1/2003 | Himmel et al. | |
| 2003/0003935 A1 | 1/2003 | Vesikivi et al. | |
| 2003/0037068 A1 | 2/2003 | Thomas | |
| 2003/0040297 A1 | 2/2003 | Pecen et al. | |
| 2003/0040300 A1 | 2/2003 | Bodic et al. | |
| 2003/0064757 A1 | 4/2003 | Yamadera et al. | |
| 2003/0083108 A1 | 5/2003 | King | |
| 2003/0101126 A1* | 5/2003 | Cheung et al. | 705/37 |
| 2003/0126015 A1 | 7/2003 | Chan et al. | |
| 2003/0130887 A1 | 7/2003 | Nathaniel | |
| 2003/0144022 A1 | 7/2003 | Hatch | |
| 2003/0154300 A1 | 8/2003 | Mostafa | |
| 2003/0163369 A1 | 8/2003 | Arr | |
| 2003/0182567 A1 | 9/2003 | Barton et al. | |
| 2003/0185356 A1 | 10/2003 | Katz | |
| 2003/0188017 A1 | 10/2003 | Nomura | |
| 2003/0191689 A1 | 10/2003 | Bosarge et al. | |
| 2003/0195039 A1 | 10/2003 | Orr | |
| 2003/0197719 A1 | 10/2003 | Lincke et al. | |
| 2003/0203731 A1 | 10/2003 | King | |
| 2003/0220866 A1* | 11/2003 | Pisaris-Henderson et al. | 705/37 |
| 2004/0003398 A1 | 1/2004 | Donian et al. | |
| 2004/0032393 A1 | 2/2004 | Brandenberg | |
| 2004/0032434 A1 | 2/2004 | Pinsky et al. | |
| 2004/0043777 A1 | 3/2004 | Brouwer et al. | |
| 2004/0043790 A1 | 3/2004 | Ben-David | |
| 2004/0045029 A1 | 3/2004 | Matsuura | |
| 2004/0045030 A1 | 3/2004 | Reynolds | |
| 2004/0054576 A1 | 3/2004 | Kanerva et al. | |
| 2004/0063449 A1 | 4/2004 | Fostick | |
| 2004/0068460 A1* | 4/2004 | Feeley et al. | 705/37 |
| 2004/0092248 A1 | 5/2004 | Kelkar | |
| 2004/0093289 A1 | 5/2004 | Bodin | |
| 2004/0136358 A1 | 7/2004 | Hind et al. | |
| 2004/0137987 A1 | 7/2004 | Nguyen | |
| 2004/0143667 A1* | 7/2004 | Jerome | 709/228 |
| 2004/0152518 A1 | 8/2004 | Kugo | |
| 2004/0185883 A1 | 9/2004 | Rukman | |
| 2004/0186789 A1 | 9/2004 | Nakashima | |
| 2004/0192359 A1 | 9/2004 | McRaild et al. | |
| 2004/0198403 A1 | 10/2004 | Pedersen | |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0204145 A1 | 10/2004 | Nagatomo | |
| 2004/0209649 A1 | 10/2004 | Lord | |
| 2004/0215793 A1 | 10/2004 | Ryan | |
| 2004/0233224 A1 | 11/2004 | Ohba | |
| 2004/0240649 A1 | 12/2004 | Goel | |
| 2004/0240861 A1 | 12/2004 | Yeend | |
| 2004/0259526 A1 | 12/2004 | Goris et al. | |
| 2005/0010641 A1 | 1/2005 | Staack | |
| 2005/0018853 A1 | 1/2005 | Lain et al. | |
| 2005/0021395 A1 | 1/2005 | Luu | |
| 2005/0033700 A1 | 2/2005 | Vogler | |
| 2005/0050208 A1 | 3/2005 | Chatani | |
| 2005/0060425 A1 | 3/2005 | Yeh et al. | |
| 2005/0086105 A1 | 4/2005 | McFadden et al. | |
| 2005/0086697 A1 | 4/2005 | Haseltine | |
| 2005/0091381 A1 | 4/2005 | Sunder | |
| 2005/0119936 A1 | 6/2005 | Buchanan | |
| 2005/0125397 A1 | 6/2005 | Gross et al. | |
| 2005/0138369 A1 | 6/2005 | Lebovitz | |
| 2005/0216341 A1 | 9/2005 | Agarwal | |
| 2005/0228680 A1 | 10/2005 | Malik | |
| 2005/0239504 A1 | 10/2005 | Ishii et al. | |
| 2005/0249216 A1 | 11/2005 | Jones | |
| 2005/0273465 A1 | 12/2005 | Kimura | |
| 2005/0289113 A1 | 12/2005 | Bookstaff | |
| 2006/0031164 A1 | 2/2006 | Kim | |
| 2006/0031327 A1 | 2/2006 | Kredo | |
| 2006/0037039 A1 | 2/2006 | Aaltonen | |
| 2006/0048059 A1 | 3/2006 | Etkin | |
| 2006/0059044 A1 | 3/2006 | Chan et al. | |
| 2006/0059495 A1 | 3/2006 | Spector | |
| 2006/0068845 A1 | 3/2006 | Muller et al. | |
| 2006/0075019 A1 | 4/2006 | Donovan et al. | |
| 2006/0075425 A1 | 4/2006 | Koch et al. | |
| 2006/0095511 A1 | 5/2006 | Munarriz et al. | |
| 2006/0106936 A1 | 5/2006 | De Luca | |
| 2006/0117378 A1 | 6/2006 | Tam et al. | |
| 2006/0123014 A1 | 6/2006 | Ng | |
| 2006/0129455 A1 | 6/2006 | Shah | |
| 2006/0135232 A1 | 6/2006 | Willis | |

(56) References Cited

U.S. PATENT DOCUMENTS

| | | |
|---|---|---|
| 2006/0141923 A1 | 6/2006 | Goss |
| 2006/0155732 A1 | 7/2006 | Momose |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0204601 A1 | 9/2006 | Palu |
| 2006/0206586 A1 | 9/2006 | Ling et al. |
| 2006/0229941 A1 | 10/2006 | Gupta |
| 2006/0242129 A1 | 10/2006 | Libes et al. |
| 2006/0276170 A1 | 12/2006 | Radhakrishnan et al. |
| 2006/0276213 A1 | 12/2006 | Gottschalk et al. |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0003064 A1 | 1/2007 | Wiseman |
| 2007/0004333 A1 | 1/2007 | Kavanti |
| 2007/0047523 A1 | 3/2007 | Jiang |
| 2007/0055439 A1 | 3/2007 | Denker |
| 2007/0055440 A1 | 3/2007 | Denker |
| 2007/0061568 A1 | 3/2007 | Lee |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0100805 A1 | 5/2007 | Ramer et al. |
| 2007/0105536 A1 | 5/2007 | Tingo, Jr. |
| 2007/0106899 A1 | 5/2007 | Suzuki |
| 2007/0113243 A1 | 5/2007 | Brey |
| 2007/0117571 A1 | 5/2007 | Musial |
| 2007/0149208 A1 | 6/2007 | Syrbe et al. |
| 2007/0157247 A1 | 7/2007 | Cordray et al. |
| 2007/0202922 A1 | 8/2007 | Myllynen |
| 2007/0204061 A1 | 8/2007 | Chen |
| 2007/0239527 A1 | 10/2007 | Nazer et al. |
| 2007/0255614 A1 | 11/2007 | Ourednik et al. |
| 2007/0290787 A1 | 12/2007 | Fiatal et al. |
| 2008/0004046 A1 | 1/2008 | Mumick et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0057917 A1 | 3/2008 | Oria |
| 2008/0070579 A1 | 3/2008 | Kankar et al. |
| 2008/0071875 A1 | 3/2008 | Koff et al. |
| 2008/0082686 A1 | 4/2008 | Schmidt et al. |
| 2008/0123856 A1 | 5/2008 | Won |
| 2008/0130547 A1 | 6/2008 | Won |
| 2008/0132215 A1 | 6/2008 | Soderstrom |
| 2008/0195468 A1 | 8/2008 | Malik |
| 2008/0243619 A1 | 10/2008 | Sharman et al. |
| 2008/0294523 A1 | 11/2008 | Little |
| 2008/0301303 A1 | 12/2008 | Matsuoka |
| 2009/0088554 A1 | 7/2009 | Shkedi |
| 2009/0275315 A1 | 11/2009 | Alston |
| 2011/0022475 A1 | 1/2011 | Inbar et al. |
| 2011/0258039 A1 | 10/2011 | Patwa et al. |
| 2011/0258049 A1 | 10/2011 | Ramer et al. |
| 2011/0282739 A1 | 11/2011 | Mashinsky et al. |

FOREIGN PATENT DOCUMENTS

| | | |
|---|---|---|
| DE | 10061984 | 6/2002 |
| EP | 0831629 | 3/1998 |
| EP | 1043905 | 10/2000 |
| EP | 1073293 | 1/2001 |
| EP | 1083504 | 3/2001 |
| EP | 1107137 | 6/2001 |
| EP | 1109371 | 6/2001 |
| EP | 1195701 | 4/2002 |
| EP | 1220132 | 7/2002 |
| EP | 1239392 | 9/2002 |
| EP | 1280087 | 1/2003 |
| EP | 1320214 | 6/2003 |
| EP | 1365604 | 11/2003 |
| EP | 1408705 | 4/2004 |
| EP | 1455511 | 9/2004 |
| EP | 1509024 | 2/2005 |
| EP | 1528827 | 5/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| EP | 1772822 | 4/2007 |
| GB | 2369218 | 5/2002 |
| GB | 2372867 | 9/2002 |
| GB | 2380364 | 4/2003 |
| GB | 2386509 | 9/2003 |
| GB | 2406996 | 4/2005 |
| GB | 2414621 | 11/2005 |
| GB | 2416887 | 2/2006 |
| GB | 2424546 | 9/2006 |
| JP | 2002140272 | 5/2002 |
| JP | 2007087138 | 4/2007 |
| JP | 2007199821 | 8/2007 |
| WO | 89/10610 | 11/1989 |
| WO | 96/24213 | 8/1996 |
| WO | 00/44151 | 7/2000 |
| WO | 00/70848 | 11/2000 |
| WO | 01/22748 | 3/2001 |
| WO | 01/31497 | 5/2001 |
| WO | 01/44977 | 6/2001 |
| WO | 01/50703 | 7/2001 |
| WO | 01/52161 | 7/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/91400 | 11/2001 |
| WO | 01/93551 | 12/2001 |
| WO | 01/97539 | 12/2001 |
| WO | 02/09431 | 1/2002 |
| WO | 02/23489 | 3/2002 |
| WO | 02/31624 | 4/2002 |
| WO | 02/35324 | 5/2002 |
| WO | 02/44989 | 6/2002 |
| WO | 02/50632 | 6/2002 |
| WO | 02/054803 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 02/086664 | 10/2002 |
| WO | 02/096056 | 11/2002 |
| WO | WO 02/091238 A2 | 11/2002 |
| WO | 02/100121 | 12/2002 |
| WO | 03/015430 | 2/2003 |
| WO | 03/019845 | 3/2003 |
| WO | 03/019913 | 3/2003 |
| WO | 03/024136 | 3/2003 |
| WO | 03/049461 | 6/2003 |
| WO | 03/088690 | 10/2003 |
| WO | 2004/057578 | 7/2004 |
| WO | 2004/084532 | 9/2004 |
| WO | 2004/086791 | 10/2004 |
| WO | 2004/093044 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2005/020578 | 3/2005 |
| WO | 2005/029769 | 3/2005 |
| WO | 2005/073863 | 8/2005 |
| WO | 2005/076650 | 8/2005 |
| WO | 2006/002869 | 1/2006 |
| WO | 2006/005001 | 1/2006 |
| WO | 2006/016189 | 2/2006 |

(56) References Cited

FOREIGN PATENT DOCUMENTS

| WO | 2006/024003 | 3/2006 |
|---|---|---|
| WO | 2006/027407 | 3/2006 |
| WO | 2006/040749 | 4/2006 |
| WO | 2006/093284 | 9/2006 |
| WO | WO 2006/104895 A2 | 10/2006 |
| WO | 2006/119481 | 11/2006 |
| WO | 2007/001118 | 1/2007 |
| WO | 2007/002025 | 1/2007 |
| WO | 2007/060451 | 5/2007 |
| WO | 2007/091089 | 8/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/088554 | 7/2009 |

OTHER PUBLICATIONS

European Search Report dated Apr. 18, 2008 for European Patent Application No. 08101188.4.
"Baugher et al", The Secure Real-Time Transport Protocol (SRTP), Mar. 2004, Network Working Group Request for Comments:3711, p. 1-53.
"Communication Pursuant to Article 94(3) EPC dated Oct. 19, 2009", European Patent Application No. 08 153 258.2 (5 pages).
"Communication Pursuant to Article 94(3) EPC dated Feb. 10, 2009", European Patent Office in related European Patent Application No. 07 118 601.9 (3 pages).
"Communication Pursuant to Article 94(3) EPC issued Jun. 25, 2009", European Patent Application No. 08 159 331.1 (3 pages).
"Digital Rights Management in the Mobile Environment", Y.Raivio &S. Luukkainen, Proceedings of the International Conference on E-Business and Telecommunication, ICETE 2006, Aug. 7, 2006.
"DRM Architecture Approved Version 2.0", OMA-AD-DRM-V2_0-20060303-A (Open Mobile Alliance, Ltd.), Mar. 3, 2006.
"English translation of First Office Action issued by State Intellectual Property Office of People's Republic of China", Chinese Applicatio No. 200480033236.X (8 pages), Dec. 4, 2009.
"English Translation of First Office Action issued by the Chinese Patent Office", Chinese Application No. 200480019404.X, Aug. 19, 2008.
"European Examination Report dated Nov. 3, 2008", European Patent Application EP 08159333.7.
"European Examination Report dated Nov. 3, 2008", European Patent Application No. EP 08159331.1.
"European Search Report Nov. 5, 2008", European Patent Application No. EP 08159331.1.
"European Search Report dated Nov. 5, 2008", European Patent Application No. EP 08159333.7.
"European Search Report dated Apr. 7, 2010", European Patent Application No. EP 10153358.6 (6 pages).
"European Search Report dated Jul. 18, 2008", European Patent Office in related EPO Application No. 08 15 3658.
"European Search Report dated Jul. 18, 2008", European Patent Office in related EPO Application No. EP 08 15 3656.
"European Search Report dated Jul. 22, 2008", European Patent Office in related EPO Application No. EP 08153651.8.
"European Search Report dated Jul. 23, 2008", European Patent Office in related EPO Application No. EP 08153654.2.
"European Search Report dated Mar. 19, 2008", European Patent Office in counterpart European Application No. EP 07 11 8601.
"Extended European Search Report dated Dec. 2, 2008", European Patent Office in counterpart EPO Application No. EP 07120620.5.
"Extended European Search Report dated Dec. 29, 2008", European Patent Office in counterpart EPO Application EP 07120480.4.
"Ghassan Chaddoud et al.", Dynamic Group Communication Security, pp. 49-56, IEEE 2001, 2001.
"International Search Report and Written Opinion of the International Searching Authority", International Application PCT/EP2008/054911, Nov. 11, 2008.
"International Search Report for International Application", PCT/FI2006/050467, dated Jul. 25, 2007.
"International Search Report in PCT Application No. PCT/GB2004/003890", Apr. 5, 2005.
"Office Action (Notice of Allowance)", USPTO dated Jun. 11, 2009 in U.S. Appl. No. 12/079,312 (5 pages).
"Office Action dated Jan. 28, 2009 in U.S. Appl. No. 10/571,709".
"Office Action dated Mar. 22, 2010", U.S. Appl. No. 12/431,961 (19 pages).
"Office Action dated Apr. 6, 2009 in related U.S. Appl. No. 12/156,335 (17 pages)".
"Office Action dated Jun. 21, 2010", U.S. Appl. No. 10/555,543 (17 pages).
"Office Action dated Apr. 6, 2009", U.S. Appl. No. 10/555,543 (14 pages).
"Office Action dated Apr. 9, 2009", U.S. Appl. No. 12/002,452 (20 pages).
"Office Action dated Feb. 5, 2009", U.S. Appl. No. 12/079,312 (12 pages).
"Office Action dated Mar. 9, 2011", Issued in related U.S. Appl. No. 12/477,766 (27 pages).
"Office Action from British Intellectual Property Office", British Application No. GB0712281.5 (5 pages), Oct. 9, 2008.
"Office Action issued Apr. 22, 2010", U.S. Appl. No. 12/156,335 (16 pages), Apr. 22, 2010.
"Office Action issued by USPTO dated Nov. 20, 2009", U.S. Appl. No. 10/571,709 (20 pages).
"Office Action issued from the USPTO dated Nov. 4, 2010", U.S. Appl. No. 12/431,961 (21 pages).
"Office Action issued from the USPTO dated Aug. 14, 2009", U.S. Appl. No. 12/431,961 (12 pages).
"Office Action issued from the USPTO dated Sep. 23, 2009", U.S. Appl. No. 12/156,335 (26 pages).
"Office Action issued from USPTO", in related U.S. Appl. No. 10/555,543 (19 pages), Oct. 20, 2009.
"Office Action Issued from USPTO dated Oct. 5, 2009", U.S. Appl. No. 10/571,709 (26 pages).
"Office Action Issued Jan. 12, 2011 by the USPTO", U.S. Appl. No. 12/484,454 (10 pages).
"Office Action Issued Mar. 29, 2011 by the USPTO", U.S. Appl. No. 10/555,543 (17 pages).
"Office Action Mar. 24, 2009", U.S. Appl. No. 12/156,335.
"Official Action from the European Patent Office dated Apr. 1, 2009", European Application No. 08 717 428.0 (4 pages).
"PCT International Preliminary Report on Patentability and Written Opinion", Issued by the International Bureau of WIPO, PCT/EP2008/054911 dated Oct. 27, 2009 (1 page).
"PCT International Search Report (Form PCT/ISA/210)", International Application PCT/EP2008/052678, Jul. 4, 2008.
"PCT International Search Report issued by PCT International Searching Authority", International Searching Authority in connection with the related PCT International Application No. PCT/NL2004/000335 (2 pages), Sep. 24, 2004.
"Schulzrinne et al, "RTP: A Transport Protocol for Real-Time Applications"", Network Working Group Request for Comments: 3550, p. 1-98, Jul. 1, 2003.
"Search Report under Section 17 dated May 20, 2008", British Patent Office in counterpart UK Application No. GB0807153.2.
"Text of Second Office Action (English Translation)", Jun. 12, 2009 in corresponding Chinese Patent Application No. 200480019404.X (2 pages).
"U.K. Combined Search and Examination Report under Sections 17 and 18(3)", U.K. Application No. GB0802177.6, May 13, 2008.
"U.K. Further Search Report under Section 17", U.K. Application No. GB0710853.3, Dec. 5, 2007.
"U.K. Patent Office Examination Report under Section 18(3)", U.K. Application No. GB0315984.5, Mar. 29, 2006.
"U.K. Search Report under Section 17", U.K. Application No. GB0710853.3, Oct. 3, 2007.

(56) References Cited

OTHER PUBLICATIONS

"U.K. Search Report under Section 17 dated Mar. 3, 2005", U.K Application No. GB0420339.4, Mar. 3, 2005.
"United Kingdom Search Report under Section 17", GB 0712281.5 (2 pages), Oct. 24, 2007.
"Wallner et al, "Key Management for Multicast: Issues and Architectures"", Jun. 1999, National Security Agency Networking Group Request for Comments: 2627, p. 1-22 (22 pages), Jun. 1, 1999.
Levine, Robert, "New Model for Sharing: Free Music with Ads", The New York Times (On-Line Edition), Apr. 23, 2007.

* cited by examiner

| URL | Keywords | Storage/Transmission Criteria | Bid Criteria | Resource Available (account balance) |
|---|---|---|---|---|
| 6a | Cars, Engines, Motorbikes | File size: 2 M;B 5 click-through links | Plan 1: 1€ | X |
| 6b | Spare Parts, Automotive | File size: 20 KB | Plan 2: 0.2€ | Y |
| 6c | Race replicas, motorbikes | File size: 100 KB; 2 selectable objects, each of 10 KB | Plan 3: 0.3€ | Z |

Ra → 6a
Rb → 6b
Rc → 6c

201 URL, 203 Keywords, 205 Storage/Transmission, 207 Bid Criteria, 209 Resource Available

Fig. 2

AD SPONSORS FOR MOBILE DEVICES BASED ON DOWNLOAD SIZE

This application is U.S. patent application that relies for priority under 35 U.S.C. 119, on Application Serial No. GB0704837.4, filed on Mar. 13, 2007, which is incorporated herein by reference.

FIELD OF THE INVENTION

The present invention relates to a method and system for ranking search results and is particularly, but not exclusively, suited to providing search results when the delivery of data corresponding to the search results is metered, such as when data are delivered to terminals connected to mobile networks.

BACKGROUND OF THE INVENTION

The explosive growth of the Internet has resulted in huge numbers of web pages being published. Finding specific information among the billions of pages of information is facilitated by search engines, such as those provided by Google™ and Yahoo™, which use "web crawlers" to locate new or modified web pages. The content of these pages is analyzed, keywords are extracted from the pages, and the keywords are added to a search index, which links to a list of web pages that contain a particular word. A weight or rank for the web page can be generated on the basis of the number of times that word occurs on the web page, and stored in the index. A variety of other parameters can be factored into the web-page rank, including the number of times other search users have clicked on the link to that web page, how extensively that web page is linked to from other web pages, personal reviews and ratings of web pages or sites, or on the basis of an amount that a given web site is willing to pay for a particular ranking.

When a user types in a search word or term, the search engine performs a lookup of the search index and generates a result set of web pages that contain the search term. Web pages within this result set may then be organised in accordance with their respective rankings, and the highest-ranked results displayed to the user.

In most cases search queries are received from terminals that are fixedly connected to the Internet (either directly, or via one or several network portions), and of course the transmission of data within the Internet—on a per request basis—is free. With the advent of widespread deployment of 3G networks, search requests are increasingly being received from terminals connected to wireless networks. Unlike the transmission of data within fixed-line networks, the transmission of data within mobile networks is typically metered on a per transmission basis. As a result, mobile terminals are faced with hitherto unseen costs for accessing sites on the basis of search results generated by search engines.

SUMMARY

In accordance with aspects of the present invention, there is provided methods and systems according to the appended claims.

More specifically according to a first aspect there is provided method of generating a search results list in response to a search request, the request comprising one or more search terms, said search terms being held in a storage system arranged to store a plurality of search listings, one or more said search terms, and a bid amount, wherein each search listing is associated with a network location providing access to a set of data, the method comprising:

receiving a search request;

accessing the storage system so as to identify search listings having search terms generating a match with the received search request;

retrieving data indicative of a first bid amount and a network location corresponding to the or each matched search term, the network location providing access to a set of data corresponding to the matched search term;

generating a second bid amount in dependence on the first bid amount and an amount of data associated with the set of data accessible via the network location;

ordering the identified search listings into a search results list in accordance with values corresponding to respective second bid amounts for the identified search listings; and outputting data indicative of the ordered search result list, said outputted data comprising a plurality of selectable links, each corresponding to a said network location.

In one embodiment a bid amount comprises an amount of resource that a third party is willing to submit so as to ensure that data is accessed from their network location; suitable resources can include money or network resources, such as use of network services for the purposes of delivering data from their network location. The search results list is most preferably ordered so as to present search listings in dependence with sponsored and/or subsidised access to sets of data accessible from respective network locations.

Preferably the method includes generating said second bid amount so as to account for an amount of data corresponding to at least one data item accessible from the network location. In one arrangement the method includes weighting the first bid amount according to the size of at least one data element accessible from the network location, whereby to generate said second bid amount. For example the method can include weighting the first bid amount according to the size of a predetermined number of data elements accessible from the network location, whereby to generate said second bid amount.

In at least one example the set of data includes a link to the network location and the method includes identifying a cost associated with accessing said link and allocating a classification dependent on the identified cost. The classifications can include fully subsidised, partially subsidised and non-subsidised, and the step of ordering the search list further comprises identifying selectable links classified as fully subsidised differently to identifying selectable links classified as partially subsidised and non-subsidised.

Conveniently the ordered list comprises a plurality of portions, each said portion corresponding to one of said classifications, whereby to identify said selectable links in accordance with said classifications.

Additionally or alternatively the set of data includes a link to a further network location, said further network location being accessible via said network location, and the method includes weighting the first bid amount according to the type of said link to the further network location, whereby to generate said second bid amounts. In one example the method further includes identifying a number of said links to the further network location and classifying the or each said link.

Most preferably the method includes identifying costs of transporting data from the network location to a terminal, by means of, for example weighting the first bid amount in accordance with the identified transport costs, whereby to generate said second bid amounts.

Embodiments of the invention are particularly convenient for use in transmitting search results to a terminal connected to a mobile communications network.

In accordance with further aspects of the invention there is provided a distributed system and apparatus for carrying out the method steps described above.

Further features and advantages of the invention will become apparent from the following description of preferred embodiments of the aspects of the invention, given by way of example only, which is made with reference to the accompanying drawings. It is to be understood that other embodiments may be utilized and structural and functional modifications may be made without departing from the scope and spirit of the present invention.

BRIEF DESCRIPTION OF THE DRAWINGS

FIG. 2 is a schematic diagram showing fields of several records stored within the search database shown in FIG. 1;

DETAILED DESCRIPTION OF THE INVENTION

As described above, embodiments of the present invention are concerned with ranking search results for delivery to content providers and/or end users via devices such as mobile terminals. The nature of the ranking process and the criteria relating thereto is described in detail below, but first a description of the infrastructure needed to support some embodiments of the invention will be presented.

Figure 1:
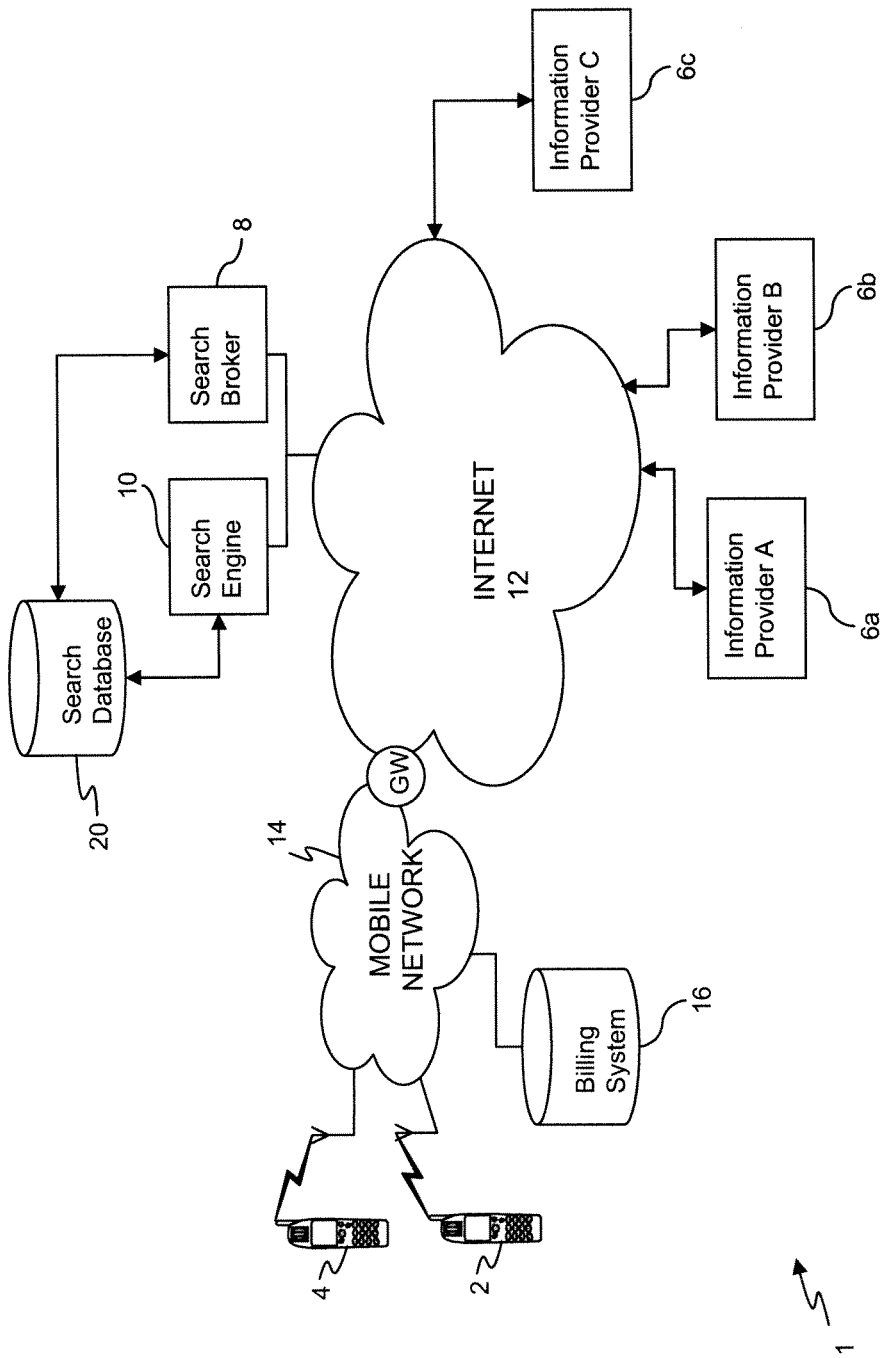
FIG. 1 is a schematic block diagram showing a distributed information system within which embodiments of the invention can operate.

FIG. 1 shows an example of a distributed information system 1 within which some embodiments of the invention operate; the messaging system 1 comprises a plurality of information providers 6a, 6b, 6c, at least some of which are arranged to store content and information, a content search broker 8, and a search engine 10, all of which are connected to a network 12 either directly or indirectly (e.g. via the Internet, local area networks (LANs), other wide area networks (WANs), and regional networks accessed over telephone lines, such as commercial information services). Mobile terminals 2, 4 are adapted to communicate with the various information providers 6a, 6b, 6c via mobile network 14 and an appropriate gateway GW, as shown; the terminals 2, 4 can be mobile telephones or PDAs, lap top computers and the like, and the mobile network 14 can comprise licensed (such as cellular networks using e.g. Global System for Mobile Communications (GSM) technology, Wideband Code Division Multiplex Access (WCDMA); Code Division Multiplex Access (CDMA), WiMax) and/or unlicensed network portions (such as Wireless LANs and Bluetooth technologies). The gateway GW can be a GPRS support node (GGSN) forming part of the mobile network 14.

The mobile terminals 2, 4 comprise browser programs adapted to locate, and access data from, web sites corresponding to the or each information provider 6a, 6b, 6c. The browser programs allow users of the terminals 2, 4 to enter addresses of specific web sites, typically in the form of Uniform Resource Locators, or URLs, and are typically adapted to receive and display web and WAP pages; in the event that a given terminal 2 is only capable of processing and displaying WAP pages, translation of a web page can be performed by a device in the network or by suitable translation software running on the device 2. As is known in the art, any given web page can include links nested therein, which, when selected, can provide access to other pages or data such as plain textual information, or digitally encoded multimedia content, such as software programs, audio signals, videos graphics, etc. Accordingly selection of such links results in transmission of further data to the terminals 2, 4.

The search engine 10 is operable to receive keywords of interest to the users of terminals 2, 4, and, by accessing data stored in the search database 20, to generate a search results list. The search results include, at least in part, entries obtained from and formatted by the results of a bidding process, to be described in detail below. The search results are organised into a list of hypertext links to documents that contain information relevant to these search terms of interest and the search engine 10 transmits this list, for example in the form of a web page, to a specified mobile terminal 2, 4, where it is displayed by the browser running on the mobile terminal.

Figure 3:
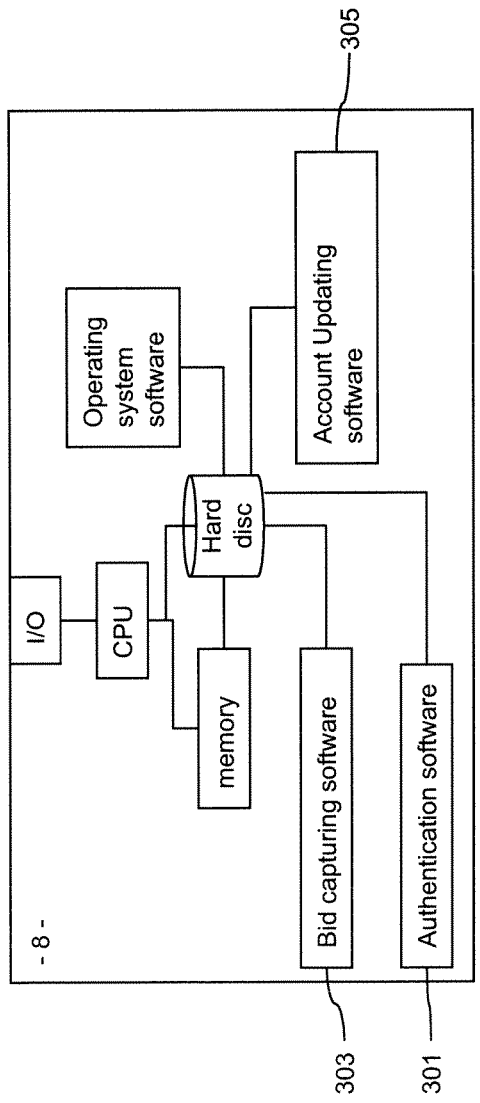
FIG. 3 is a schematic diagram showing components of the search broker shown in FIG. 1.

Turning now to FIGS. 2 and 3, an example of a record that is stored in the search database 20, and a method for populating the record, will be described. In one arrangement the search broker 8 is preferably embodied as a web server, and essentially provides an interface to the search database 20 via which the information providers 6a, 6b, 6c can submit their bids to influence their position in the search results list. As can be seen from FIG. 3, the search broker 8 comprises standard operating system, storage, Input/Output, processor and memory components, and bespoke software components in the form of authentication software component 301, bid capturing software component 303, and account updating software component 305 (the latter will be described later in relation to FIG. 5).

The authentication software component 301 comprises a firewall, not shown, which is arranged to protect the bid capturing software component 303 and information stored in the search database 20 from unauthorised access. Additional security may be provided via enhancements to the standard communications protocols such as Secure Hyper Text Transfer Protocol (HTTP) or the Secure Sockets Layer (SSL). The bid capturing software component 303 is arranged to process authenticated bids received from an information provider 6a,

6b, 6c. In a preferred embodiment a bid is a request for a URL corresponding to the information provider to be preferentially ranked relative to URLs of other information providers in a list of search results.

As described above, embodiments of the invention are concerned with providing search results to end users either directly to a mobile terminal or indirectly via a content provider. In cases where search results are delivered to mobile devices, transmission of data over wireless networks is chargeable; since the recipient of the data is typically paying for receipt of these data, the amount of data being transmitted is material to the recipient. Thus, embodiments of the invention are arranged to rank search results in dependence on delivery costs to be borne by the subscriber. This might be different to the actual delivery costs, since information providers can frame their bid criteria so as to subsidise delivery of their data to mobile terminals.

Accordingly, the bid criteria submitted by information providers can include two sets of criteria: a first set, applying to delivery of search results to fixed-line terminals, and a second set, applying to delivery of search results over radio networks, being designed to account for transmission charges expected to be levied when a mobile user accesses data from its network location. Alternatively or additionally, there can be a single set of bid criteria, and the storage and/or transmission criteria can be used by the search engine 10 at the time of providing search results to modify the bid amounts.

In either case, when ranking search results, it is assumed that the mobile terminal 2, 4 will click on the link corresponding to any given search result; accordingly the amount that respective information providers are willing to bid for preferential ranking of their network location within the search results is evaluated on the basis of this assumption—i.e. on the basis of the amount of data that will be delivered to the mobile terminal 2, 4 upon selection of the link in the search results.

In one arrangement a bid comprises a plurality of components, including one or more key words of interest, storage characteristics and/or transmission characteristics of the data accessible via the URL and a set of bid criteria. Typical bid criteria include one or more of:

- A maximum amount that the information provider 6a, 6b, 6c is willing to pay for appearing in any given set of search results;
- The lowest acceptable ranked position in a set of search results;
- A resource fund and a period during which the resource fund applies: the fund essentially being a pot of resources from which an amount can be deducted each time the information provider appears in a set of search results;
- Links that are always accessible at no cost
- Links that are accessible at a subsidised cost (or not).
- Portion(s) of the links which can be used for Subsidized Access.
- etc.

Typical storage characteristics and/or transmission characteristics include one or more of:

- The size of the web page accessible via the URL associated with the information provider 6a, 6b, 6c;
- If the link is associated with Subsidised Access or not.
- The number of click-though links accessible via the URL associated with the information provider 6a, 6b, 6c (categorised as inter-web page, meaning that the link leads to a web page owned by the same information provider, or external to web page, meaning that the link leads to a web page owned by a different information provider);
- The size of the data accessible via objects accessible via the URL associated with the information provider 6a, 6b, 6c, such as click-through banners, which lead to other websites. Such objects can additionally include executables, audio or video content, all of a determinable size;
- A list of mobile network operators that is permitted to deliver content from the information provider 6a, 6b, 6c.
- Valid data plans associated with consumers, operators and/or web page owners.

These criteria can be specified by a given information provider 6a, 6b, 6c via a form or similar (not shown), and in the case of the storage and/or transmission characteristics, the bid capturing software component 303 can be arranged to download the web page so as to verify, or correct, the submitted data. In addition the portion of the bid which can be used to provide Subsidized Access can be defined by search service provider. These characteristics are preferably combined by the bid capturing software component 303 so as to provide a single measure of the storage characteristics and/or transmission characteristics. In one arrangement the characteristics are combined so as to generate an overall download requirement, as follows:

Download requirement=Size of directly accessible web page+No. inter-web page click-through links*$P_1$+No. external web page click-through links*$P_2$ Where $P_1$ and $P_2$ are probability values indicative of the likelihood of users accessing the click-through links. Many information providers maintain statistics indicative of access to internal and external links, so this information can be provided by the information providers at the time of submitting the storage and/or transmission criteria. Alternatively the bid capturing software component 303 can apply estimates for the respective probabilities, in the form of discrete values (such as, if there are eight inter-web click through links (so eight layers of clicks), the probability of accessing level one click is 75%, the probability of accessing level two click is 50%, the probability of accessing level three click is 30%; the probability of accessing level four click is 25%; the probability of accessing level five click is 20% etc.) or in the form of a continuous function.

Once the data have been verified, the bid capturing software component 303 stores the same in a database record corresponding to the information provider 6a; an example of a suitable schema is shown in FIG. 2. As can be seen, in this representation, any given record R comprises for example five fields: the URL corresponding to the information provider is stored in field 201, the keywords in field 203, the storage criteria in field 205, and bid criteria in field 207. It will be appreciated that FIG. 2 is highly schematic and that, in the case of fields 205, 207, there the schema will most likely include subfields corresponding to respective elements thereof.

Figure 4:
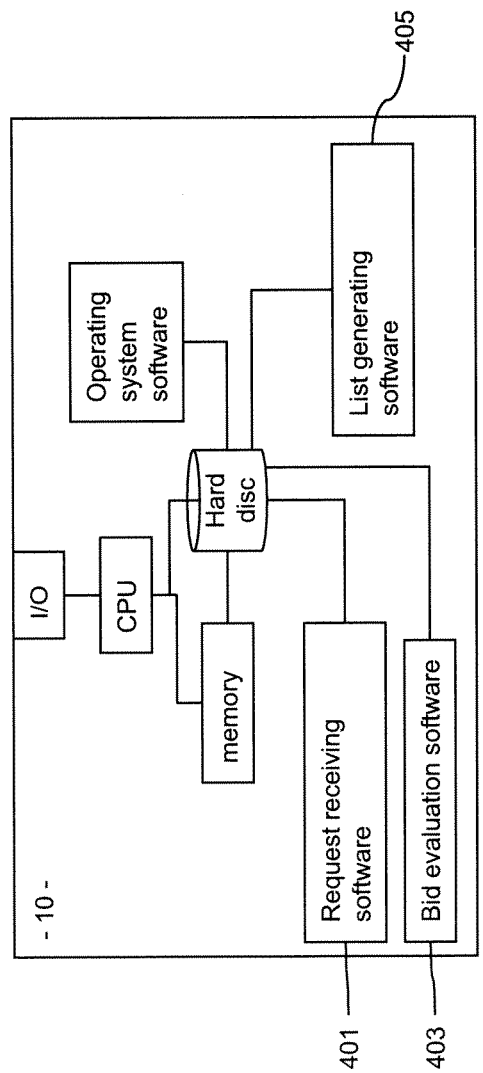
FIG. 4 is a schematic diagram showing components of the search engine shown in FIG. 1.

The processes involved in ranking of search results will now be described with reference to FIG. 4, which shows components of the search engine 10. The search engine 10 is preferably embodied as a web server, and comprises standard operating system, storage, processor, input/output interfaces, together with includes various bespoke software components 401, 403, 405. These software components are arranged, respectively, to receive a search request and identify keywords within the request (request receiving component 401); to query the search database 20 on the basis of the keywords and evaluate respective bids associated with information providers registered in respect of the keywords (bid evaluation software component 403) so as to generate corresponding search listings; and to arrange the search listings in a list in accordance with the bid amounts (list generating software component 405). The request receiving software component 401 is also arranged to identify the terminal 2 to which the search listings are to be transmitted, so that the list generating software component 405 can deliver the results to this terminal 2. In addition, once the search results have been delivered, the list generating software component 405 triggers an update to the account balances of those information providers appearing on the results list. Details of this updating process will be described in relation to FIG. 5, described below.

In view of the foregoing comments relating to the parameters used to rank search results—namely access costs—the bid evaluation software component 403 is arranged to identify and combine the various criteria that influence the access costs, as will now be described in more detail. By way of an introductory remark, it will be apparent from inspection of the bid criteria that the actual magnitude of a bid that is submitted for a particular set of keywords may vary per search request received. This is due to the fact that a) the number of information providers that have registered with the search database 20 can vary over time, b) the funds available to a given information provider to place a bid varies over time (since funds get depleted) and c) the data accessible from network locations (thus storage/transmission characteristics) vary over time. This variation is particularly acute in relation to the bid criterion specifying a "lowest acceptable ranked position in a set of search results", and can be seen from consideration of an example in which the bid criteria specify a lowest acceptable ranked position of "third". The amount that will be deducted from information provider 6a's account balance will vary as the number of information providers, and their downloadable content, changes, since e.g. the greater the number of information providers that have registered for the keywords "cars, engines, motorbikes", the greater the amount of resources that will have to be deducted from the information provider 6a's balance to keep information provider 6a listed in third position. In addition, those information providers having resource-heavy web sites will have to bid a significantly greater amount than would information providers having fewer resources to download in order to get higher ranking.

The details of the algorithms used by the bid evaluation software component 403 to account for these various factors will now be described for various information providers that have entries in the search database 20 corresponding to keywords specified in a search request. In a first arrangement, it is assumed that the information providers have submitted a single set of bid criteria, to be applied irrespective of whether the recipient of the search results is a mobile or fixed terminal. It is also assumed that the magnitude and type of data that are downloadable from the corresponding network locations have been specified and verified in the manner described above, so that fields 201, 203, 205, 207 in the search database 20 have been populated in respect of their selected keywords.

Assuming information provider 6a has an overall storage transmission characteristic of 3 MB (2 MB+5 click-through links), and that the provider 6a has specified 1€ per search listing (with no preference in relation to position in the rankings) then the bid evaluation software component evaluates a bid per KB of 1€/2 MB=0.0003€/kbyte. As described above, this effectively represents the amount that the sponsor is willing to pay for the mobile terminal 2 to receive data from its network location. Assuming information provider 6b has an overall storage characteristic of 20 kbyte and has specified 0.2€ per search listing, then the amount of subsidy for accessing the network location corresponding to provider 6b is 0.2/20=0.01€/kbyte; further, assuming information provider 6c has an overall storage transmission characteristic of 120 kbyte (100 kbyte+2 objects) and has specified 0.3€ per search listing, then the amount of subsidy for accessing the network location corresponding to provider 6b is 0.3/120=0.0025€/kbyte. It can therefore be seen that the effective bids, when ranked in accordance with delivery through a mobile network, result in a ranking of 6b, 6c, 6a, which is quite different to the ranking that applies in respect of delivery solely through fixed networks (6a (1€), 6c (0.3€), 6b (0.2€)).

Operation of the various components of the distributed information system 1 when servicing a search request will now be described with reference to FIG. 5, which is a timing diagram showing the various messages and data transmission between components 2, 10, 20, 6c and 16. At step S5.1, the mobile terminal 2 sends a search request to the search engine 10 using the browser application of the terminal 2, the search request comprising one or more keywords of interest. The search request is received by the search engine 10, having been routed via the mobile network 14, gateway GW and other network portions, and the request receiving component 401 extracts the keywords from the search request, formulating a query based thereon and sending same to the search database 20 (step S5.3). The search database 20 performs a lookup in respect of the keywords and retrieves data indicative of network location, storage criteria, bid criteria, and account balance (collectively referred to as ranking criteria) for all information providers listed against keywords corresponding to the search request, and creates a message M1 including this information. Thus in one arrangement the message M1 comprises a plurality of entries, each relating to a respective information provider and having a predetermined format so as to accommodate the ranking criteria. The message M1 is then sent to the search engine 10 (step S5.5).

The foregoing passages assume that all of the information providers listed in the search database 20 have submitted bid criteria when registering via the search broker 8. However, the search database 20 will also hold entries corresponding to information providers that are not interested in paying for a position in a list of search results (and in respect of which the bid criteria is null). Since the query performed at step S5.5 will return all information providers corresponding to the keywords specified in the search request, the message M1 will include entries corresponding to non-paying and paying information providers.

The bid evaluation software component 403 is arranged to receive the message M1 sent from the search database 20, to retrieve data therefrom, and to apply a ranking algorithm, such as the one described above, in respect of each of the paying information providers listed in the message M1 (step S5.7). The output of this ranking process is a list of network locations, each accompanied by a bid/kbyte value. The list generating software component 403 then compiles a list comprising selectable links to network locations corresponding to the information providers, the list being ordered in accordance with the bid/kbyte value, so that the network location corresponding to the highest bid/kbyte value is positioned at the top of the list. In addition, the paying—and ranked—network locations are preferably separated from the non-paying information providers.

Figure 6:
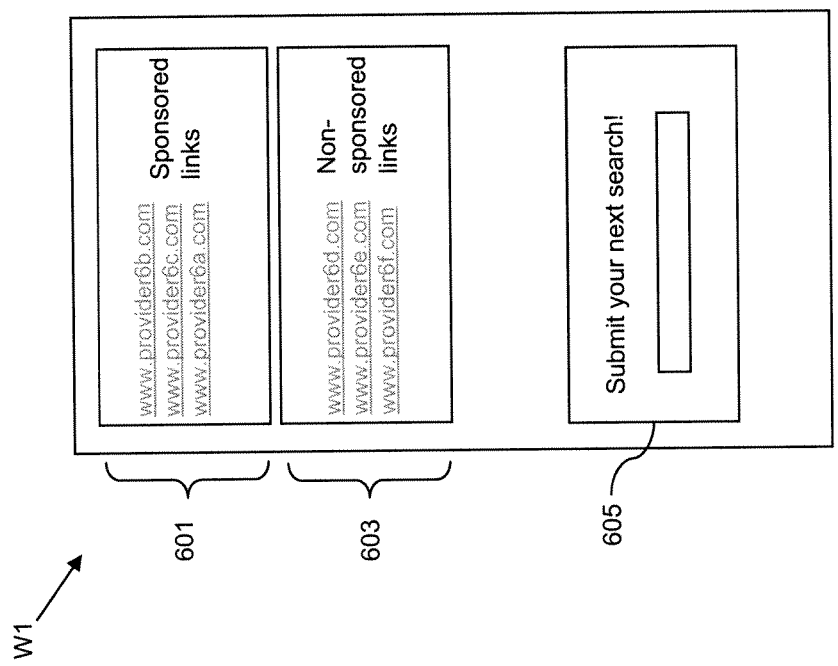
FIG. 6 is a schematic diagram showing an example web page output from the search engine during the process shown in FIG. 5.

Referring to FIG. 6, the sorted list preferably comprises a subsidised portion 601, a fully chargeable portion 603, and a search requesting portion 605. Preferably account identification information is coded into the subsidised portion 601 of the search results page W1 on a per listing basis, and each of the links appearing within the subsidised portion 601 actually corresponds to the network address of the search broker 8.

Thus, when a link within the subsidised portion 601 is selected, this causes the terminal 2 to send an account identifier and URL corresponding to the selected listing to the search broker 8; the search broker 8 is then responsible for updating the respective account together with re-directing the request to the URL of the selected listing. Typically the account identifier is embedded as a parameter in the URL, but it could be embedded within a cookie that is transmitted to, and maintained at, the terminal 2 along with the results page W1.

Accordingly the results page W1 is transmitted to the terminal 2 at step S5.9; assuming the user to select one of the links appearing within the subsidised portion 601 (e.g. information provider 6c), message M2 comprising account identification and the selected URL is transmitted to the search broker 8 (step S5.11). When received, the message M2 is processed by the account updating software component 305 shown in FIG. 3, causing the account updating component 305 to send a standard HTTP retrieval request to the URL listed within message M2, the request having, as source address, a network identifier corresponding to the terminal 2 (step S5.13). At the same time or shortly thereafter, the account updating software component 305 accesses the search database 20 on the basis of account identifier retrieved from message M2, and at step S5.15 updates the account balance (field 209) in accordance with the bid criteria evaluated at step S5.7. Data are transmitted to the terminal 2 under control of the information provider corresponding to the selected URL in response to the re-directed access request transmitted from the search broker 8 at step S5.13. Whilst this is shown in FIG. 5 (step S5.19), it will be appreciated that transmission of data from the network location occurs independently of the components of data information system 1, and is shown for completeness only.

In the event that the user of the terminal 2 selects a link listed in the non-subsidised portion 603 of the search listings, access to, and retrieval of data from, the web site corresponding thereto will progress in accordance with standard methods and independently of the search broker 8.

Figure 5:
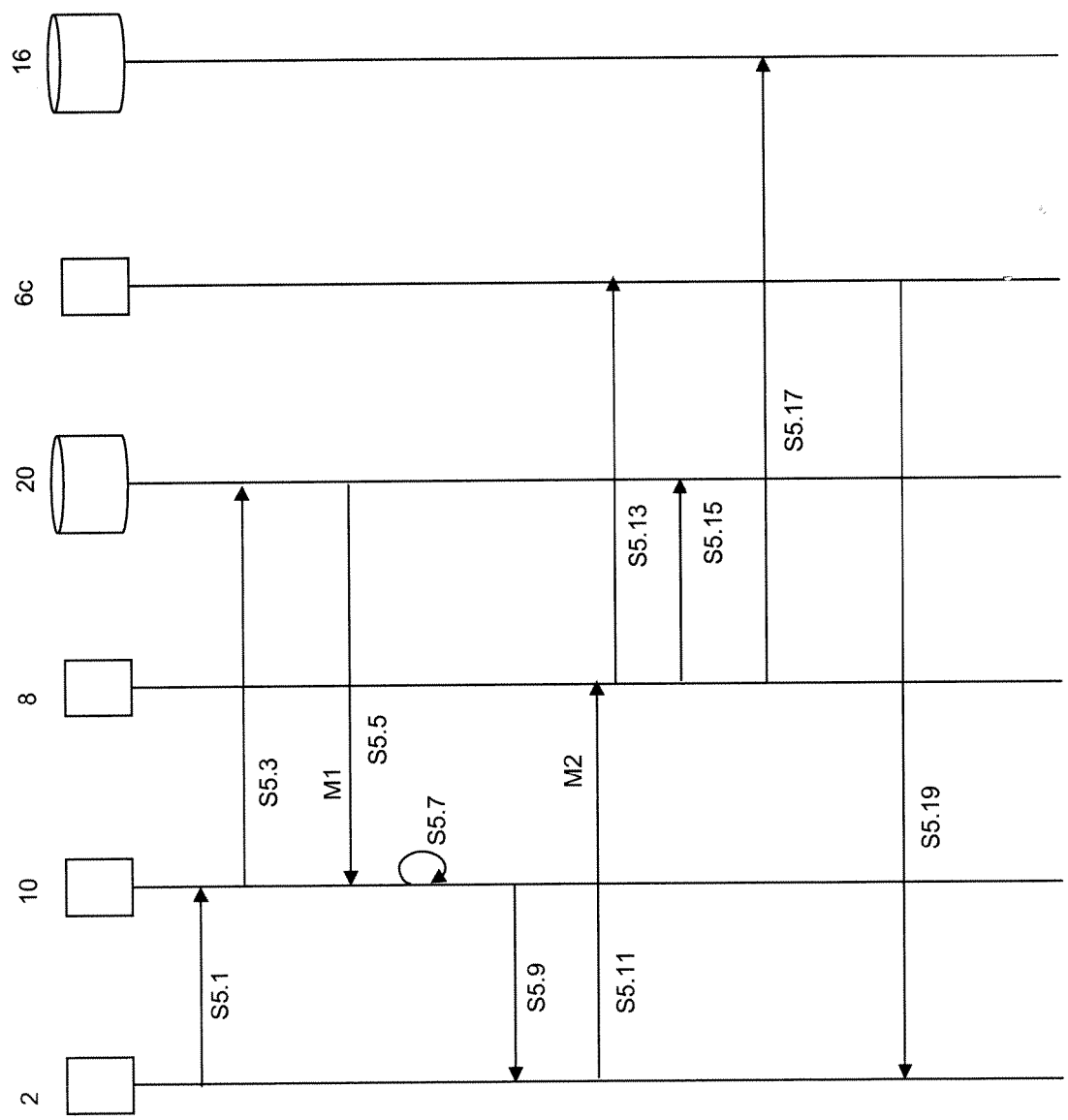
FIG. 5 is a timing diagram showing data flows between components of the distributed information system of FIG. 1 when operating according to a process of an embodiment of the present invention.

It will be noted that FIG. 5 includes a step involving the search broker 8 sending a message to the billing system 16 associated with the mobile network portion 14 shown in FIG. 1. This relates to a further aspect of the invention, namely one in which the actual transport costs are factored into the ranking algorithm described above. In this aspect of the invention, the search broker 8 has access to transport costs data associated with the various mobile network operators, and, depending on the operator with which the terminal 2 is connected (together with parameters identifying whether the terminal is at home/roaming, time of day etc.), the costs associated with delivering data from the various network locations to the terminal 2 are evaluated by the bid evaluation software component 403 as part of step S5.7. For example, assuming the costs of transport to terminal 2 are P=0.007€/kbyte, then the costs of accessing data from information providers 6a, 6b, 6c are as follows:

Information provider 6a: 1€/2 MB=0.0003€/kbyte, which is less than the transport costs, so that, whilst the data is subsidised, it will nevertheless be delivered at a cost.

Information provider 6b: 0.2/20 kbyte=0.01€/kbyte, which is greater than the transport costs, so that data will be delivered at no cost.

Information provider 6c: 0.3/120 kbyte=0.0025€/kbyte, which is less than the transport costs, so that, whilst the data is subsidised, it will nevertheless be delivered at a cost.

Figure 7:
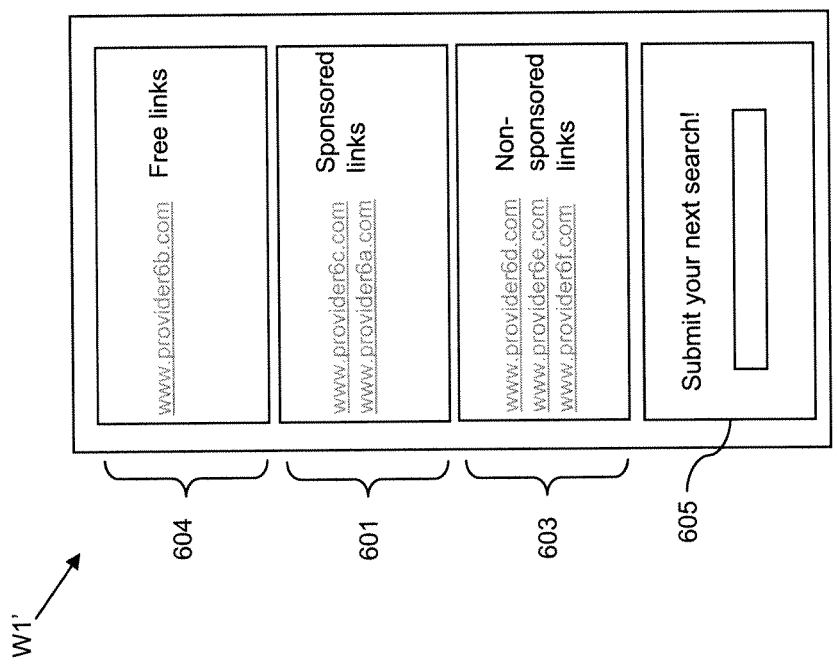
FIG. 7 is a schematic diagram showing an alternative example web page output from the search engine during the process shown in FIG. 5.

Turning to FIG. 7, this additional refinement to the ranking process means that the search listings can be further categorised for selection by the user—into "free" portion 604, "subsidised" portion 601 and "fully charged" portion 603 within web page W1'.

Figure 8:
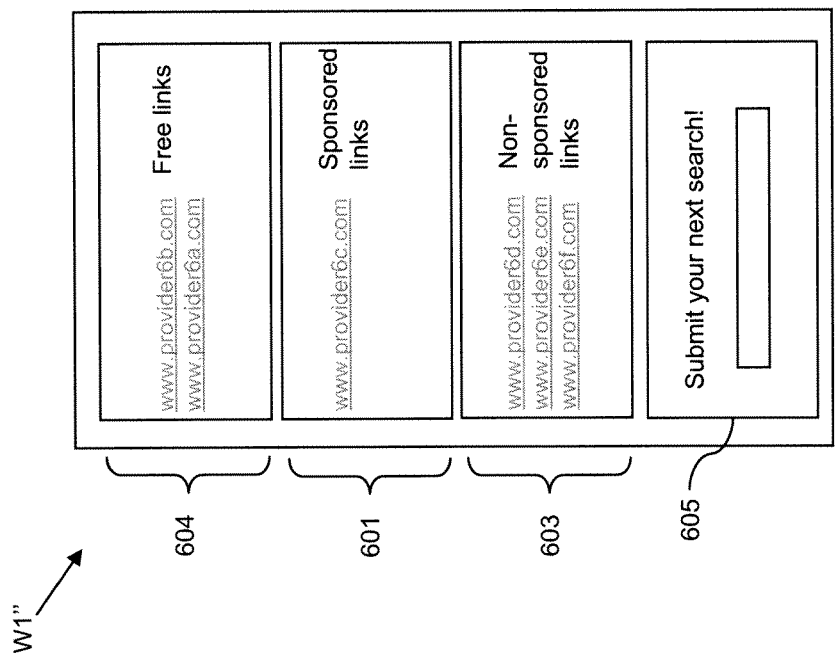
FIG. 8 is a schematic diagram showing a further web page output from the search engine during the process shown in FIG. 5.

In another arrangement the bid criteria 207 specified by any given information provider 6a, 6b, 6c can include data indicative of the amount of money that the information provider is willing to pay so as to cover transmission of data to any given mobile terminal; for example, assuming the bid criteria 207 corresponding to information provider 6a specifies that all delivery costs will be covered, the web page W1" appears as shown in FIG. 8.

Returning to FIG. 5, data indicative of the actual cost to the subscriber to receive data from the selected information provider 6c are transmitted to the billing system 16 at step S5.17, preferably before the data are transmitted from the information provider, so that the subscriber's balance can be "topped up" to cover the subsidised costs.

Figure 9:
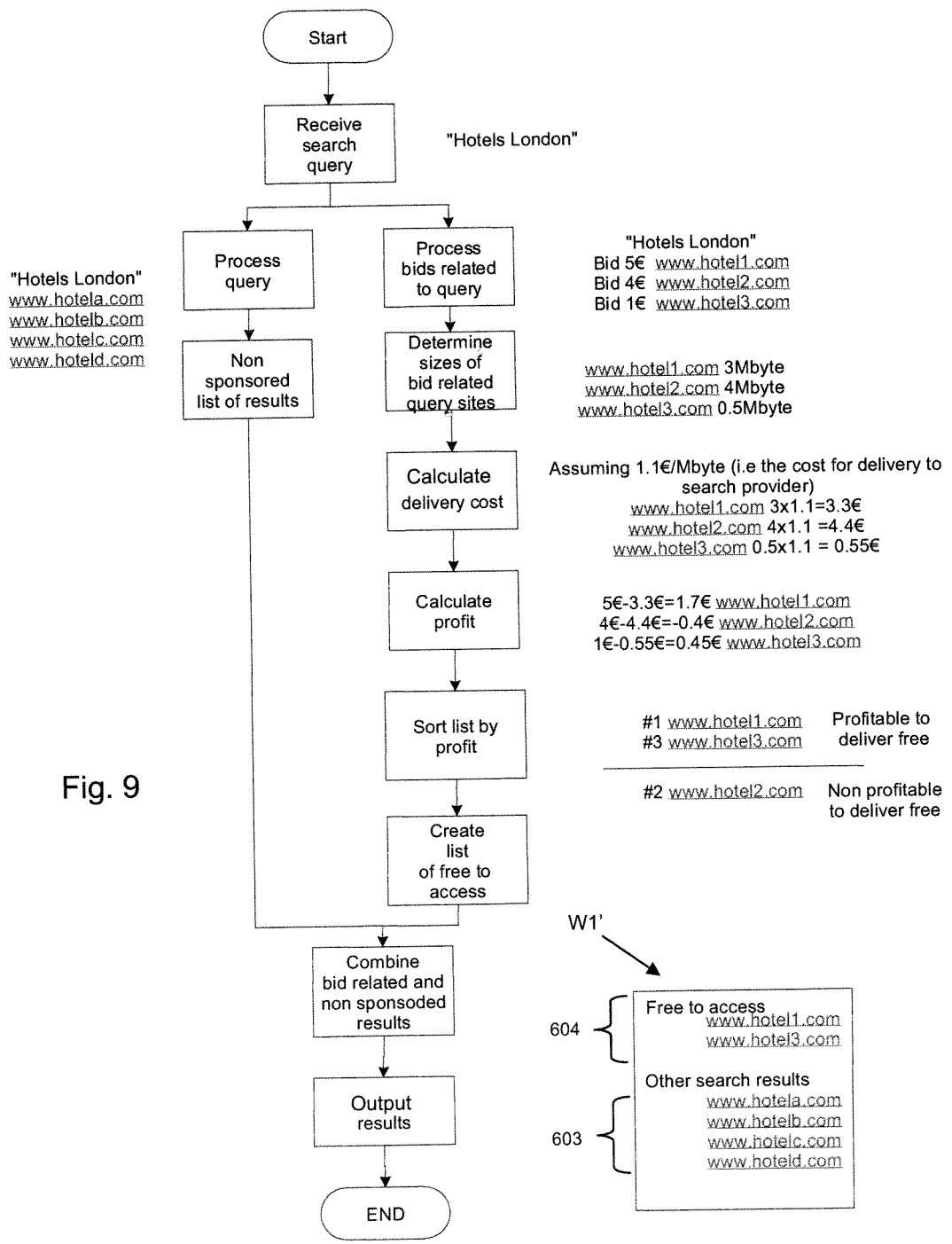
FIG. 9 is a schematic flow diagram showing a method according to an embodiment of the invention, as performed by the components of the distributed information system of FIG. 1.
Figure 10:
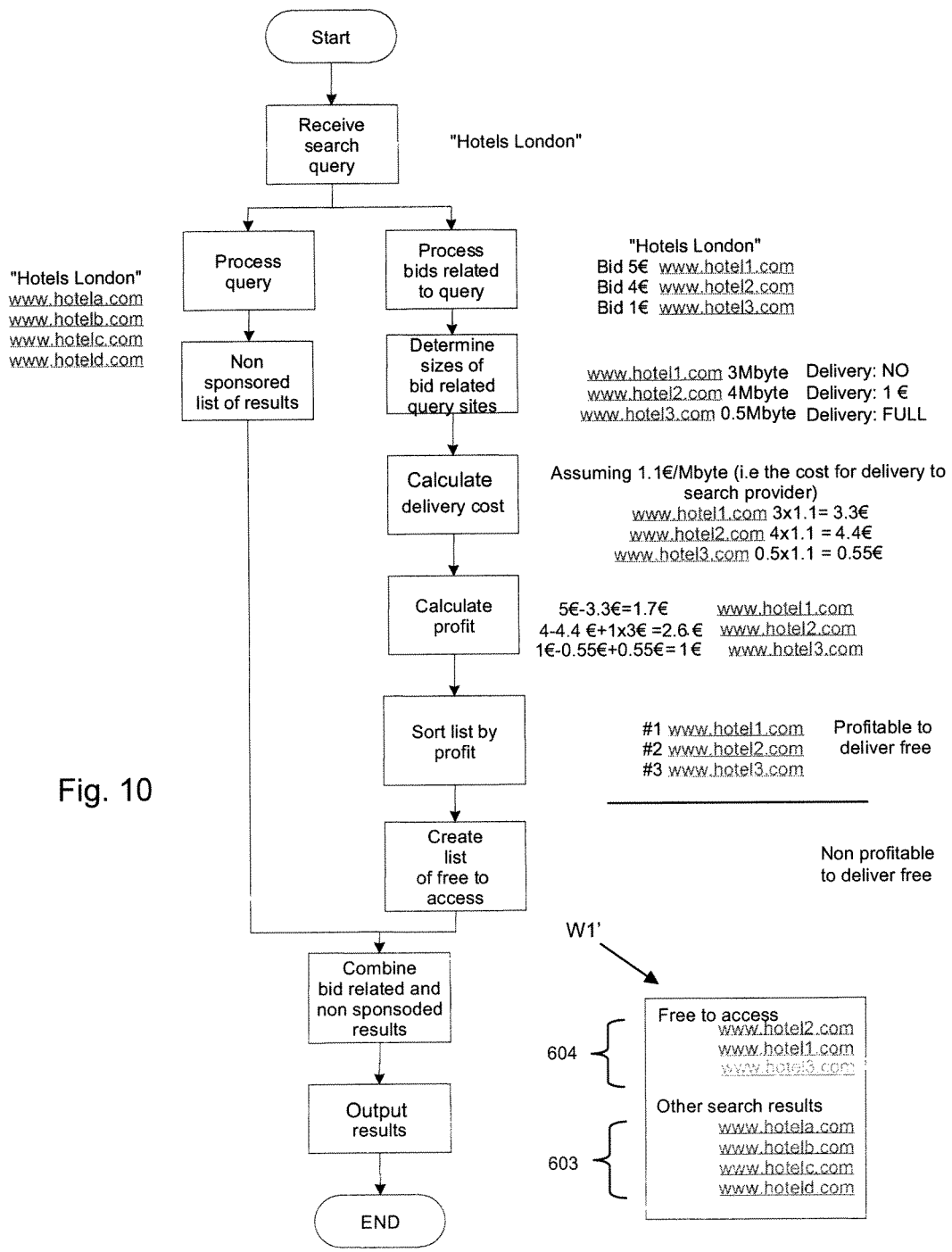
FIG. 10 is a schematic flow diagram showing a method according to an alternative embodiment of the invention, as performed by the components of the distributed information system of FIG. 1.

FIGS. 9 and 10 show the steps involved for an example in which the search request relates to "hotels in London": FIG. 9 relates to the case where the information source submits bid criteria so as to influence the position of the information source in the search results, but does not agree to subsidise access to their site, and FIG. 10 relates to the case where the information source both submits bid criteria so as to influence the position of the information source in the search results and at least some of the information sources (corresponding to hotel2 and hotel3) agree to subsidise—either partly or fully—the transport costs associated with accessing data from their site. These two examples clearly show the effects of weighting the bid amounts in accordance with the amount of data to be transmitted and subsidising subsequent requests to access data from the information sources.

Figure 11:
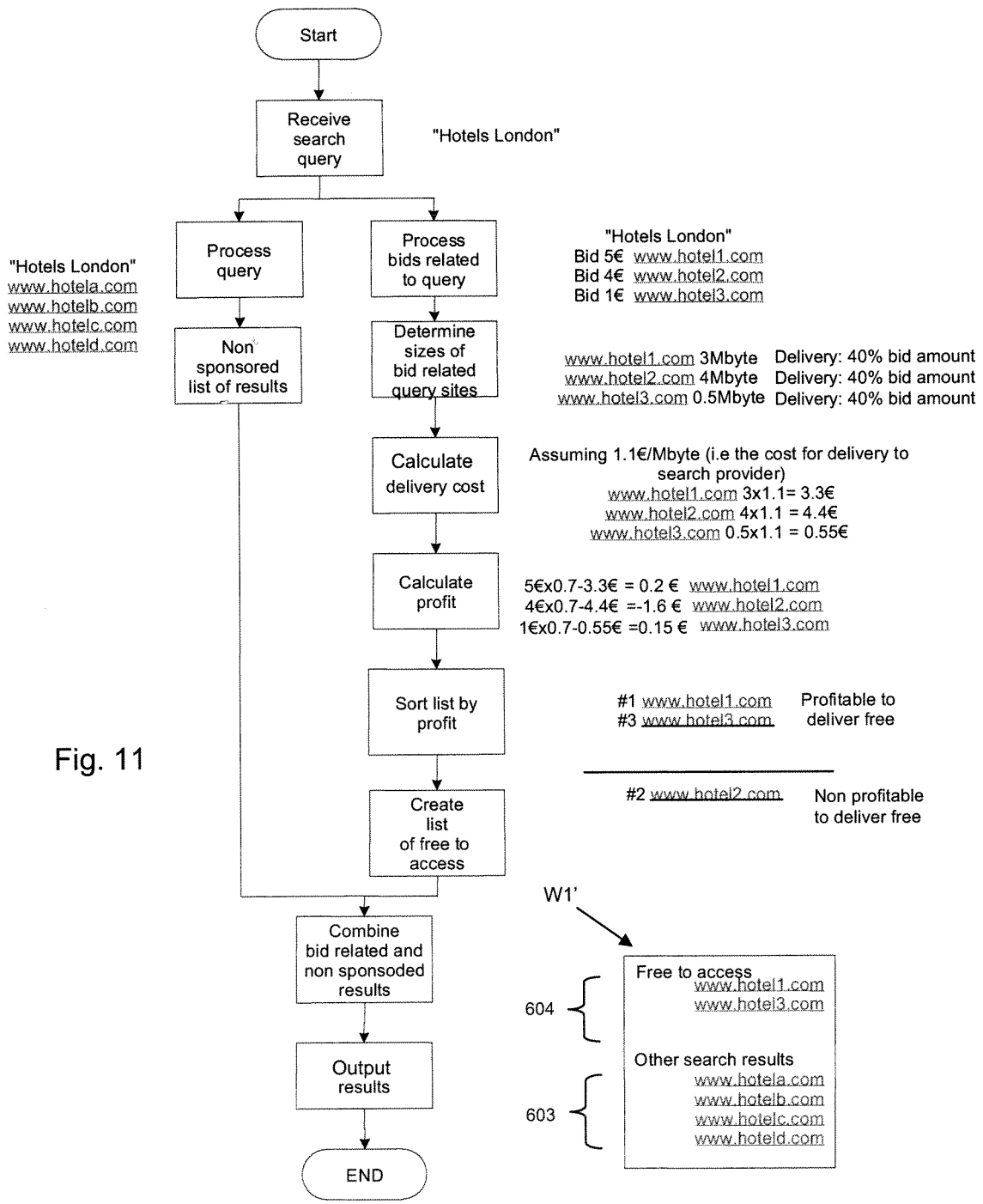
FIG. 11 is a schematic flow diagram showing a method according to a yet further embodiment of the invention, as performed by the components of the distributed information system of FIG. 1.

FIG. 11 relates to the case in which the amount of subsidy specified by the information provider in relation to transport costs is related to their bid amount (i.e. the amount that the information source has bid for the purposes of achieving a preferential ranking position in the search results transmitted at step S5.9). In one arrangement the bid criteria submitted by the information source specifies a transport subsidy as a percentage of the bid amount (this being submitted via the search broker 8 in the manner described above), and in the specific example shown in FIG. 11 the transport subsidy is specified as 40% of the bid amount.

In each of FIGS. 9, 10 and 11, the web page W1' transmitted to the mobile terminal 2 only shows search results corresponding to web sites that have been determined as free to access (portion 604) (in addition to the non-sponsored web sites (portion 603)). It can clearly be seen from these examples that the list generating software component 405 orders the search results in accordance with profit associated with any given information source.

Additional Details and Modifications

Whilst in the above embodiments the search engine 10 is described as having access to the storage and/or transmission characteristics in addition to the bid criteria, in an alternative arrangement the distributed information system 1 could include an additional network component, arranged to store the storage and/or transmission characteristics, and to receive search results, ranked in accordance with conventional methods, from the search engine 10, and to then factor in the storage and/or transmission characteristics. Thus in this alternative arrangement the ranking process comprises separate stages, performed at different logical devices, rather than comprising a single integrated process.

As described above, an information provider can store content and/or promotional data, and accordingly can be hosted or sponsored by an advertiser.

The search requests submitted at step S5.1 can be submitted from a terminal other than the one to which the search results are to be delivered; for example, requests could be submitted as part of an automated process, which includes, as one of the input fields, an identifier corresponding to the terminal 2 destined to receive the search results. In addition, search requests could be typed in or entered via speech recognition software.

As described above, each record $R_i$ in the search database 20 corresponding to an information provider can comprise a field relating to an account balance for the information provider. The balance is quantified in terms of resources, which can be money or usage of communications services. The latter type of resource would be particularly convenient for the arrangement in which transportation costs are factored into the ranking process, since communications resources could be directly traded rather than being translated into and out of financial amounts.

In the case where the information provider specifies "free access" and the transport costs are higher than the €/kbyte associated with the downloaded content, all actual delivery costs will be subtracted from the corresponding account balance field 209 when a given URL is selected.

Whilst in the above embodiments the ranked and categorised search results are delivered to a mobile terminal, the search results could alternatively be transmitted to a search results service, for further processing of the results or delivery thereof to the mobile device.

In addition to the bid criteria described above, the information source can submit data indicative of an overall, or specifically allocated, budget. In addition, whilst it is preferably that the search listings, network location and key words are related, any given information provider can specify a link to a network location that is unrelated to the keywords (e.g. an information source providing information in relation to the key words "hotels London" can specify links to network locations unrelated to these keywords).

By way of clarification, the term "non-sponsored Link" is to be understood as including (but not limited to) a link to a network location associated with an information source whose ranking in a list of search results is defined purely on the relevance of the content of the web page to key words related thereto and is unrelated to any bid amounts associated therewith.

The term "sponsored link" is to be understood as including (but not limited to) a link to a network location associated with an information source whose ranking in a list of search results is dependent on bid amounts relating to the position of the link in the list of search results. However, in general the term does not refer to subsidizing access to content associated with any of the links listed in the search results.

The term "subsidized access" is to be understood as including (but not limited to) part of the bid amount, the amount of the subsidy being dependent on the parameters available for the purposes of providing subsidised or free access to a network location associated with an information source. In addition the term "subsidized access" can cover, wholly or in part, the costs of associated with accessing data from the network location associated with the information source. The term "bid criteria" is to be understood as including (but not limited to) criteria for use in determining how a bid amount can be used to provide subsidised access to a network location associated with an information source.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of generating a search results list in response to a search request, the request comprising one or more search terms, the search terms being held in a storage system arranged to store a plurality of search listings, one or more search terms, and a bid amount, wherein each search listing is associated with a network location providing access to a set of data, the method comprising:
   receiving, at a server, a search request made by a subscriber;
   accessing, by the server, the storage system so as to identify search listings having search terms generating a match with the received search request;
   retrieving, by the server, data indicative of a first bid amount and a network location corresponding to each matched search term, the network location providing access to a set of data corresponding to the matched search term;
   generating, by the server, a second bid amount based on the first bid amount and an amount of data associated with the set of data accessible via the network location, wherein the second bid amount is at least partially indicative of a transmission cost to the subscriber for delivery of the data corresponding to the search term;
   ordering, by the server, the identified search listings into a search results list in accordance with values corresponding to respective second bid amounts for the identified search listings; and
   outputting, by the server, data indicative of the ordered search result list, the outputted data comprising a plurality of selectable links, each corresponding to a network location.

2. A method of generating a bid amount for use in generating search results, the method comprising:
   receiving, at a server, data indicative of a first bid amount and a network location corresponding to a search term, the network location providing access to a set of data corresponding to the search term;
   generating, by the server, a second bid amount in dependence on the first bid amount and an amount of data associated with the set of data accessible via the network location, wherein the second bid amount is at least partially indicative of a transmission cost to a subscriber for delivery of the data corresponding to the search term; and
   storing, by the server, the generated second bid amount and search term corresponding thereto in a storage system.

3. The method of claim 1, wherein generating the second bid amount is performed so as to account for an amount of data corresponding to at least one data item accessible from the network location.

4. The method of claim 3, including weighting the first bid amount according to the size of at least one data element accessible from the network location, to generate the second bid amount.

5. The method of claim 4, including weighting the first bid amount according to the size of a predetermined number of data elements accessible from the network location, to generate the second bid amount.

6. The method of claim 1, wherein the set of data includes a link to the network location and the method includes identifying a cost associated with accessing the link and allocating a classification dependent on the identified cost.

7. The method of claim 6, wherein the classifications include fully subsidized, partially subsidized and non-subsidized.

8. The method of claim 7, in which ordering the search list further comprises identifying selectable links classified as fully subsidized differently to identifying selectable links classified as partially subsidized and non-subsidized.

9. The method of claim 8, in which the ordered list comprises a plurality of portions, each portion corresponding to one of the classifications, whereby to identify the selectable links in accordance with the classifications.

10. The method of claim 1, wherein the set of data includes a link to a further network location, the further network location being accessible via the network location, and the method includes weighting the first bid amount according to the type of the link to the further network location, to generate the second bid amounts.

11. The method of claim 10, including identifying a number of the links to the further network location and classifying each link.

12. The method of claim 1, including identifying costs of transporting data from the network location to a terminal, in which the method further comprises weighting the first bid amount in accordance with the identified transport costs, to generate the second bid amounts.

13. The method of claim 1, including periodically accessing a given network location so as to determine the amount of data associated therewith, and updating the storage system based on the determined amount of data.

14. The method of claim 1, including transmitting the search results to a terminal connected to a mobile communications network.

15. The method of claim 14, in which the search request is received from the terminal.

16. The method of claim 1, in which the storage system comprises an account database arranged to hold a record for each of a plurality of network information providers, each network information provider corresponding to a network location and each account record comprising data indicative of one or more search terms, a specified bid amount, a storage and/or transmission characteristic corresponding to the network location, and an account balance, the method further comprising:
   querying respective account balances prior to ordering the search listings into the search results list so as to identify availability of resources; and
   modifying the specified bid amounts based on the identified resource availability, whereby to generate the bid amounts for use in ordering the search listings.

17. The method of claim 1, wherein the bid amount corresponds to a metered amount that is used to offset the account of the information provider associated with the network location upon receipt of a retrieval request from the terminal for data from the network location, the method further comprising:
   receiving a retrieval request from the terminal to retrieve information associated with a link selected from the ordered search result list;
   recording a retrieval request event including account identification information corresponding to the network information provider;
   identifying a metered amount corresponding to the request event, and
   offsetting the metered amount against the account corresponding to the information provider so as to modify the account balance.

18. A method comprising:
   receiving, by a server, a search request in respect of a terminal;
   accessing, by the server, a storage system to identify search listings having search terms generating a match with the received search request;
   for each of the identified search listing:
      identifying, by the server, data indicative of costs associated with transmitting data from a corresponding network location to the terminal;
      modifying, by the server, a bid amount based on a storage and/or transmission characteristic and an identified transmission costs, wherein the bid amount is at least partially indicative of a transmission cost to a subscriber associate with the terminal for delivery of the data corresponding to the search term;
   ordering, by the server, the identified search listings into a search results list in accordance with values corresponding to the modified bid amounts for the identified search listings; and
   transmitting, by the server, data indicative of the ordered search result list to the terminal, the transmitted data comprising a plurality of selectable links, each corresponding to a the network location.

19. A system comprising:
   a storage system arranged to store a plurality of search listings, wherein each search listing is associated with a network location providing access to a set of data, one or more search terms, and a bid amount;
   an interface for receiving a search request from a subscriber;
   a processor configured to:
      identify a search listing corresponding to the search request;
      retrieve data indicative of a first bid amount and a network location corresponding to each matched search term, the network location providing access to a set of data corresponding to the matched search term;
      generate a second bid amount in dependence on the first bid amount and an amount of data associated with the set of data accessible via the network location, wherein the second bid amount is at least partially indicative of a transmission cost to the subscriber for delivery of the data corresponding to the search term; and
      generate a search results list of the identified search listings on the basis of the second bid amount, the generated list comprising a selectable link corresponding to the network location, wherein the interface is arranged to output the generated list.

20. The system of claim 19, wherein the storage system is arranged to hold a record for each of a plurality of network information providers, each network information provider corresponding to a network location and each account record comprising data indicative of one or more search terms, a specified bid amount, an amount of data corresponding to the set of data accessible from the network location, a classification of the network location, and an account balance.

21. The system of claim 20, wherein the processor is configured to arrange the search results list in accordance with the classification of the network location.

22. The system of claim 21, wherein the classification includes subsidized data transmission and non-subsidized data transmission, and the processor is configured to arrange the search results list such that the selectable links corresponding to subsidized data transmission appear at the top of the list.

23. A system for generating a search results list in response to a request for search results in respect of one or more search terms, the apparatus comprising:
   storage means arranged to store a plurality of search listings, wherein each search listing is associated with a network location providing access to a set of data, one or more search terms, and a bid amount;
   interfacing means for receiving a search request in respect of the terminal;
   processing means arranged to:
      identify a search listing corresponding to the search request;
      retrieve data indicative of a first bid amount and a network location corresponding to each matched search term, the network location providing access to a set of data corresponding to the matched search term;
      generate a second bid amount in dependence on the first bid amount and an amount of data associated with the set of data accessible via the network location, wherein the second bid amount is at least partially indicative of a transmission cost to a subscriber associated with the terminal for delivery of the data corresponding to the search term; and
      generate a search results list of the identified search listings based on the second bid amount, the generated list comprising a selectable link corresponding to the network location,
   wherein the interfacing means are arranged to output the generated list.

24. A method comprising:
   receiving a search request;
   accessing a storage system so as to identify search listings having search terms generating a match with the received search request;
   ordering the identified search listings into a search results list in accordance with values corresponding to respective bid amounts for the identified search listings, wherein the bid amounts are generated in dependence on a first bid amount and an amount of data associated with the set of data accessible via the network location, the second bid amount being at least partially indicative of a transmission cost to a subscriber associated with the terminal for delivery of the data corresponding to the search term; and
   outputting data indicative of the ordered search result list, the outputted data comprising a plurality of selectable links, each corresponding to a network location.

25. A non-transitory computer-readable medium having stored thereon a data structure comprising a computer program causing a computing device to perform a method comprising:
   receiving a search request;
   accessing a storage system to identify search listings having search terms generating a match with the received search request;
   retrieving data indicative of a first bid amount and a network location corresponding to each matched search term, the network location providing access to a set of data corresponding to the matched search term;
   generating a second bid amount in dependence on the first bid amount and an amount of data associated with the set of data accessible via the network location, wherein the second bid amount is at least partially indicative of a transmission cost to a subscriber for delivery of the data corresponding to the search term;
   ordering the identified search listings into a search results list in accordance with values corresponding to respective second bid amounts for the identified search listings; and
   outputting data indicative of the ordered search result list, the outputted data comprising a plurality of selectable links, each corresponding to a network location.

* * * * *